United States Patent Office 2,714,904
Patented Aug. 9, 1955

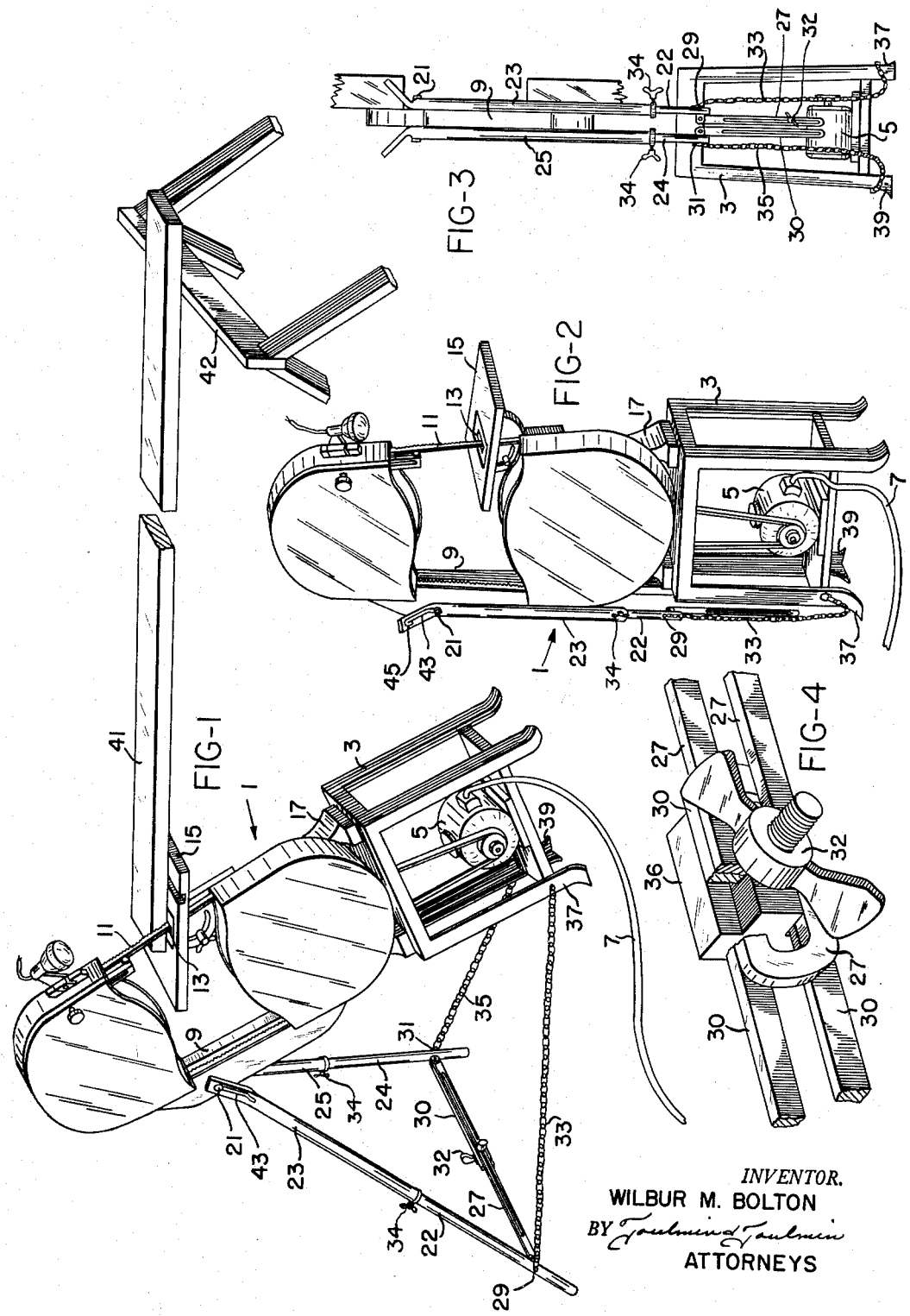

2,714,904

TILTABLE BAND SAW STRUCTURE AND METHOD OF USING THE SAME

Wilbur M. Bolton, Dayton, Ohio, assignor to The Commonwealth Engineering Company of Ohio, Dayton, Ohio, a corporation of Ohio Application March 20, 1953, Serial No. 343,744

4 Claims. (Cl. 143—24)

This invention relates to a band saw assembly and to a method of using the same; more particularly the invention relates to an attachment for a band saw.

The invention contemplates as a primary objective increasing the useful working range of a band saw.

The invention particularly contemplates the provision of a structural arrangement which will facilitate the formation of angular surfaces on long workpieces.

It is also an objective of the invention to provide a band saw attachment which is readily removable from the band saw or which may be telescoped on the frame of the band saw in such position that it will not cause interference with normal operations of the unit.

The invention will be more fully understood by reference to the following detailed description and accompanying drawings wherein:

Figure 1 illustrates in perspective an embodiment of the structure of invention;

Figure 2 illustrates the structure of Figure 1 in another position thereof;

Figure 3 is a rear elevational view of the structure of Figure 2; and

Figure 4 is a detail view of a portion of the structure of Figure 1.

Referring to the drawings there is shown generally at 1 in Figure 1 a band saw having a base 3 which supports a motor 5 having a cable 7 suitably adapted for connection to a source of power.

Vertically spaced wheels within the housing 9 have an endless saw blade 11 passing thereover and the wheels and blades are driven through the motor 5 by any suitable power transmission means as belts between the motor and pulley shafts.

The endless saw blade 11 passes downwardly in its movement through a throat 13 in a tiltable plate 15 supported from a suitable frame member 17. The throat 13 is provided with a removable throat plate of hardwood which supports the blade and may be readily replaced when worn.

The plate is itself tiltable to an angle of 45° with respect to the supporting frame and the floor line, and accordingly short pieces may be cut thereon to any desired angle between 0° and 45°. As the desired angle of cut increases however, the length of board which normally may be suitably angled or mitered decreases since the floor limits the board length which may be presented to the moving blade. Further for such cutting the floor area for a considerable distance forward of the saw must be free to permit the presentation of the board.

In the preferred embodiment of the present invention a rearward portion of the frame of the band saw 1 is provided with a pivot bolt 21 (Figure 3) which is positioned in slots of upper leg members 23, 25 and secures the same to the frame. Each of the leg members 23, 25 cooperates with a lower member which telescopes within the upper leg as at 22 and 24, the upper and lower leg members being secured together in extended or telescoped position as by wing nuts 34.

Leg members 23, 25 are spaced apart by rigid members 27 and 30 which are slotted and are secured together approximately centrally by a T-shaped member 36 (Figure 4) which slidingly passes through a slot of each of the members 27 and 30 and secures the members together in cooperation with wing nut 32.

To the lower leg members 22, 24 there is suitably secured at 29 and 31 the chains 33, 35, respectively. Chain 33 is secured to leg 37 of the base 3, while chain 35 is secured to a similar leg 39. The chains when extended as in Figure 1 permit the tilting of the band saw 1 to an angle of at least 45° with respect to the floor. A board 41, the end of which is to be provided with a mitre, is shown mounted on the tilted band saw in the figure and is provided with a suitable support 42.

In operation, to cut an end of a very long board at an angle of 45°, the table is first tilted at an angle of 45° with respect to the floor, and the table is then at an angle of 45° with respect to the saw blade 11 also. The band saw itself, as shown in Figure 1, is then tilted at an angle of 45° with respect to the floor, which movement does not change the relationship between the blade and the table, but does bring the table parallel with the floor.

With the structure of invention in this latter position the board 41 may be fed into the saw in a plane which is parallel with the flooring and may be supported horizontally as at 42. Accordingly neither the flooring nor any material thereon limit the movement of the board or the positioning thereof and thus workpieces of any desired length may be cut.

When the cutting operation is completed the band saw 1 may be returned to its normal vertical position (Figure 2) the lower leg members 22, 24 telescoping within the upper leg members; the upper leg members 23, 25 moving upwardly past pivot bolt 21 which is loosened to permit relative movement of the bolt and upper leg members with relation to slot hook portion 45 and slot 43 (Figure 2). Thus as shown in Figure 2 the leg members may then be again secured by bolt 21 against the frame portion 9 and the chains and legs are neatly secured out of the way for the usual operations of the band saw.

It is to be noted with respect to the band saw assembly of invention that all the relative parts of the band saw 1 are in the same relative position whether the saw be utilized in the normal mode of operation or in the new angled mode; thus no structural changes whatever are necessary in the saw when transferring from one mode of operation to the other.

It will be understood that this invention is susceptible to modification in order to adapt it to different usages and conditions and accordingly, it is desired to comprehend such modifications within this invention as may fall within the scope of the appended claims.

I claim:

1. In combination, a band saw having a forwardly independently tiltable plate, and means for supporting the band saw as a unit in an angular position tilted rearwardly with respect to the forward end of the saw, said means comprising a pair of extensible legs pivoted on the band saw.

2. In combination, a band saw having a frame and a forwardly independently tiltable plate supported thereon, a pivot bolt in an aperture of the frame rearwardly thereof, legs pivotally mounted on said bolt and each having a slot through which the bolt passes, the legs being movable rearwardly from the frame to support the same in a rearwardly tiltable position, and means on the bolt to secure the legs to the frame.

3. In combination, a band saw having a frame, a base supporting the frame, a forwardly independently tiltable plate on the frame, and means for supporting the band saw as a unit in an angular position tilted rearwardly with respect to the forward end of the saw, said means comprising support means pivotally secured to the band saw frame above the base.

4. In combination, a band saw having a frame, a base supporting the frame, a plate on the frame and tiltable forwardly independently with respect to the frame and base, said band saw including the frame, plate and base being tiltable as a unit in a rearward direction, and spaced legs having a rigid base extending therebetween supported from the frame of the band saw above the base, said legs being adapted to support the band saw including the frame, base and plate in the tilted position.

References Cited in the file of this patent

UNITED STATES PATENTS

| | | |
|---|---|---|
| 490,212 | O'Connor | Jan. 17, 1893 |
| 575,026 | Cooper | Jan. 12, 1897 |
| 814,652 | Harrold et al. | Mar. 6, 1906 |
| 1,100,362 | Evans | June 16, 1914 |
| 2,064,232 | Tepper | Dec. 15, 1936 |
| 2,080,475 | Hedgpeth | May 18, 1937 |
| 2,166,455 | Wetherbee | July 18, 1939 |
| 2,188,827 | Bradfield | Jan. 30, 1940 |
| 2,444,369 | Rentos | June 29, 1948 |

FOREIGN PATENTS

| | | |
|---|---|---|
| 60,131 | France | Sept. 12, 1863 |